(12) United States Patent
Savage et al.

(10) Patent No.: US 7,720,054 B2
(45) Date of Patent: May 18, 2010

(54) ROUTER CONFIGURED FOR OUTPUTTING UPDATE MESSAGES SPECIFYING A DETECTED ATTRIBUTE CHANGE OF A CONNECTED ACTIVE PATH ACCORDING TO A PRESCRIBED ROUTING PROTOCOL

(75) Inventors: Donnie Van Savage, Raleigh, NC (US); Donald Earl Slice, Jr., Cary, NC (US); Roy Michael Brooks, New Hill, NC (US); Matthew Henry Birkner, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 1207 days.

(21) Appl. No.: 10/790,204

(22) Filed: Mar. 2, 2004

(65) Prior Publication Data
US 2005/0195835 A1 Sep. 8, 2005

(51) Int. Cl.
H04L 12/28 (2006.01)
H04L 12/26 (2006.01)

(52) U.S. Cl. ........................ 370/389; 370/419

(58) Field of Classification Search ................. 370/229, 370/230.1, 232, 235, 236, 248, 252, 253, 370/255, 351, 389, 392, 400, 419, 41
See application file for complete search history.

(56) References Cited

U.S. PATENT DOCUMENTS

| | | | |
|---|---|---|---|
| 5,519,704 A * | 5/1996 | Farinacci et al. | 370/402 |
| 5,694,390 A * | 12/1997 | Yamato et al. | 370/230 |
| 5,881,243 A | 3/1999 | Zaumen et al. | |
| 5,905,867 A * | 5/1999 | Giorgio | 709/224 |
| 5,917,808 A | 6/1999 | Kosbab | |
| 5,917,820 A | 6/1999 | Rekhter | |
| 5,951,651 A | 9/1999 | Lakshman et al. | |
| 6,195,351 B1 * | 2/2001 | Hiscock et al. | 370/389 |
| 6,198,920 B1 * | 3/2001 | Doviak et al. | 455/426.1 |
| 6,256,314 B1 | 7/2001 | Rodrig et al. | |
| 6,282,678 B1 | 8/2001 | Snay et al. | |
| 6,292,832 B1 | 9/2001 | Shah et al. | |
| 6,298,381 B1 | 10/2001 | Shah et al. | |
| 6,308,148 B1 | 10/2001 | Bruins et al. | |
| 6,339,595 B1 | 1/2002 | Rekhter et al. | |

(Continued)

OTHER PUBLICATIONS

Enhanced Interior Gateway Routing Protocol White Paper, Feb. 12, 2003, Cisco, pp. 1-5.*

(Continued)

*Primary Examiner*—Aung S Moe
*Assistant Examiner*—Curtis A Alia
(74) *Attorney, Agent, or Firm*—Leon R. Turkevich (57) ABSTRACT

A first router is configured for monitoring prescribed attributes of an active path connected to the first router, and supplying an update message to a second router, according to a prescribed routing protocol such as Enhanced Interior Gateway Routing Protocol (EIGRP), that specifies a detected change by the first router in at least one of the prescribed attributes of the connected active path. Hence, the second router, in response to receiving the update message, can update an internal topology table based on the detected change in the active path connected to the first router, and selectively adjust an internal routing table based on the detected change relative to queuing policies for prescribed data flows.

40 Claims, 7 Drawing Sheets

U.S. PATENT DOCUMENTS

| | | | |
|---|---|---|---|
| 6,373,838 B1* | 4/2002 | Law et al. .................... | 370/352 |
| 6,377,543 B1* | 4/2002 | Grover et al. ................ | 370/227 |
| 6,385,204 B1 | 5/2002 | Hoefelmeyer et al. | |
| 6,385,615 B1* | 5/2002 | Haeri et al. ................... | 707/10 |
| 6,392,990 B1 | 5/2002 | Tosey et al. | |
| 6,393,486 B1 | 5/2002 | Pelavin et al. | |
| 6,463,061 B1 | 10/2002 | Rekhter et al. | |
| 6,493,317 B1 | 12/2002 | Ma | |
| 6,516,348 B1* | 2/2003 | MacFarlane et al. ........ | 709/224 |
| 6,526,056 B1 | 2/2003 | Rekhter et al. | |
| 6,529,894 B1 | 3/2003 | Haeri et al. | |
| 6,604,241 B1 | 8/2003 | Haeri et al. | |
| 6,618,389 B2 | 9/2003 | Hoefelmeyer et al. | |
| 6,643,706 B1 | 11/2003 | Marques et al. | |
| 6,675,009 B1 | 1/2004 | Cook | |
| 6,714,549 B1* | 3/2004 | Phaltankar .................. | 370/397 |
| 6,785,226 B1* | 8/2004 | Oltman et al. .............. | 370/228 |
| 7,016,355 B1* | 3/2006 | Graf et al. .............. | 370/395.21 |
| 7,042,834 B1* | 5/2006 | Savage ....................... | 370/218 |
| 7,193,971 B2* | 3/2007 | McClellan ................. | 370/238 |
| 7,257,081 B2* | 8/2007 | Rajan et al. ................. | 370/231 |
| 2003/0090996 A1 | 5/2003 | Stewart | |
| 2003/0107992 A1 | 6/2003 | Garcia-Luna-Aceves et al. | |
| 2003/0137974 A1 | 7/2003 | Kwan et al. | |
| 2003/0179742 A1* | 9/2003 | Ogier et al. ................. | 370/351 |
| 2003/0198190 A1* | 10/2003 | Rajan et al. ................. | 370/252 |
| 2004/0076160 A1* | 4/2004 | Phaltankar ............... | 370/395.1 |
| 2004/0221058 A1* | 11/2004 | de Boer et al. ............. | 709/238 |
| 2004/0258002 A1* | 12/2004 | Tran et al. ................... | 370/254 |
| 2005/0213586 A1* | 9/2005 | Cyganski et al. ....... | 370/395.41 |
| 2006/0268792 A1* | 11/2006 | Belcea ....................... | 370/338 |

OTHER PUBLICATIONS

Crawley et al., "A Framework for QoS-based Routing in the Internet", Request for Comments: 2386, Network Working Group, Aug. 1998.

Albrightson et al., "EIGRP—A Fast Routing Protocol Based On Distance Vectors", Proceedings Networld + Interop. [online], Jan. 1, 1994, Retrieved from the Internet: <URL: http://www.cse.ucsc.edu/research/ccrg/publications/onterop94.ps.gz>, XP008106882, pp. 1-13.

Gouda et al., "Maximizable routing metrics" Network Protocols, 1998. Proceedings, Sixth International Conference ON Austin, TX, USA Oct. 13-16, 1998, Los Alamitos, CA, USA, IEEE Comput. Soc, US., Oct. 13, 1998, pp. 71-78.

European Search Report mailed Oct. 8, 2009, EP Application No. 5723854.5, 5 Pages.

* cited by examiner

ROUTER CONFIGURED FOR OUTPUTTING UPDATE MESSAGES SPECIFYING A DETECTED ATTRIBUTE CHANGE OF A CONNECTED ACTIVE PATH ACCORDING TO A PRESCRIBED ROUTING PROTOCOL

BACKGROUND OF THE INVENTION

1. Field of the Invention

The present invention relates to transport of messages specifying routing information between Internet Protocol (IP) routers according to a prescribed routing protocol, for example a distance vector routing protocol such as Enhanced Interior Gateway Routing Protocol (EIGRP).

2. Description of the Related Art

Wide area packet switched networks such as the Internet have become an integral part of worldwide commerce in part due to the ability of different networks to interoperate without central control. In particular, the decentralization of control is possible due to routing protocols which enable routers to communicate amongst each other and share routing information: routing protocols include operations such as router advertisement, router discovery, link state advertisement, and the sharing of all or at least a portion of respective routing tables. Distance-vector routing protocols call for each router to send all or a portion of its routing table in a routing-update message at regular intervals to each of its neighboring routers. Hence, each router can build a topology table that provides a detailed representation of the network topology relative to the corresponding router, and a routing table that enables routing of packets according to the network topology One particular routing protocol of interest is disclosed in U.S. Pat. No. 5,519,704 to Farinacci et al., the disclosure of which is incorporated in its entirety herein by reference. Farinacci et al. describes a router configured for executing a distance vector routing protocol, referred to as Enhanced Interior Gateway Routing Protocol (EIGRP). As described in Farinacci et al., EIGRP enables routers to initially exchange routing information, including topology tables, enabling each router to identify its neighboring topology. Once the routers have established their respective topology tables and routing tables, a router only needs to send an EIGRP-based update message to another router only if a link transition occurs that affects the network topology.

EIGRP also utilizes the Diffusing Update Algorithm (DUAL), developed by J. J. Garcia-Luna-Aceves. DUAL enables EIGRP routers to determine whether a path advertised by a neighbor is looped or loop-free, and enables an EIGRP router to locate alternate paths without waiting for updates from other routers. Hence, upon receiving an EIGRP update message indicating a link transition, the EIGRP router updates its routing table and utilizes the DUAT algorithm to identify loop-free path, determine a most likely successor path based on cost metrics, and update its routing table accordingly. EIGRP routers are commercially available from Cisco Systems, San Jose, Calif.

The EIGRP protocol specifies that each link for a corresponding destination specified in a routing table of a given router can have one of two possible states, mainly "Active" and "Passive". The "Active" state refers to a state when a link is not available (e.g., when a link failure occurs), at which point the router is "actively" attempting to identify from its topology a feasible successor to reach the destination. The "Passive" state refers to a state where the router is "passive" (i.e., does not need to identify a feasible successor) because the topology table already identifies an available link (i.e., a link that can reach the destination within prescribed cost parameters). Routers can generate update messages in response to: (1) receiving an update message from another router, and entering an "Active" phase to identify a feasible successor; or (2) detecting a transition in a link due to either a link failure (i.e., available link transitions to an unavailable link), or a link recovery (i.e., an unavailable link transitions to an available link).

Although existing EIGRP routers can determine network topology and generate routing tables accordingly based on link availability, the existing EIGRP protocol limits the generation of a new update message by a source router (i.e., a router not having received an update message related to the new update message) to only instances of detecting a link failure or a link recovery. The limiting of new update messages provides the benefit of minimizing routing protocol traffic between routers, but at the expense of limiting the exchange of useful information between routers.

SUMMARY OF THE INVENTION

There is a need for an arrangement that enables dynamic attributes of available links between routers to be shared in an efficient manner, without substantially increasing routing protocol traffic between the routers, enabling routers to optimize routing of data flows between routers.

There also is a need for an arrangement that enables routers to share dynamic attributes of available paths between routers, each available path having at least one available link, enabling the routers to direct data flows for distinct data flows based on queuing policies, and based on changes in the available paths as specified by the dynamic attributes.

There also is a need for an arrangement that enables a router to dynamically calculate the highest available bandwidth between endpoints, even when the endpoints are separated by multiple routers connected by distinct topologies and link speeds.

These and other needs are attained by the present invention, where a first router is configured for monitoring prescribed attributes of an active path connected to the first router, and supplying an update message to a second router, according to a prescribed routing protocol, that specifies a detected change by the first router in at least one of the prescribed attributes of the connected active path. Hence, the second router, in response to receiving the update message, can update an internal topology table based on the detected change in the active path connected to the first router, and selectively adjust an internal routing table based on the detected change relative to queuing policies for prescribed data flows.

One aspect of the invention provides a method in a router. The method includes identifying an active path connected to the router based on at least one active link connected to the router. The method also includes monitoring prescribed attributes of the active path connected to the router, and detecting a change in at least one of the prescribed attributes of the connected active path. The method also includes outputting an update message, specifying the change, to a second router according to a prescribed routing protocol. The identification of an active path based on at least one active link enables prescribed attributes of to be evaluated in terms of an active path instead of individual links, enabling aggregation of prescribed attributes (e.g, metrics) of active links associated with the active path. Moreover, the outputting of an update message that specifies the change in the at least one of the prescribed attributes of the connected active path enables neighboring routers in a network to select paths for optimized routing of data flows based on changes in dynamic attributes of the network that may affect network traffic or throughput despite no change in network topology.

Another aspect of the present invention provides a router. The router includes a plurality of interfaces configured for establishing respective active links with at least a second router. The router also includes a link associating resource, a monitoring resource, and a routing protocol resource. The link associating resource is configured for identifying an active path connected to the router based on at least one active link connected to the router. The monitoring resource is configured for monitoring prescribed attributes of the active path connected to the router, the monitoring resource detecting a change in at least one of the prescribed attributes of the connected active path. The routing protocol resource configured for outputting an update message, specifying the change, to a second router according to a prescribed routing protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
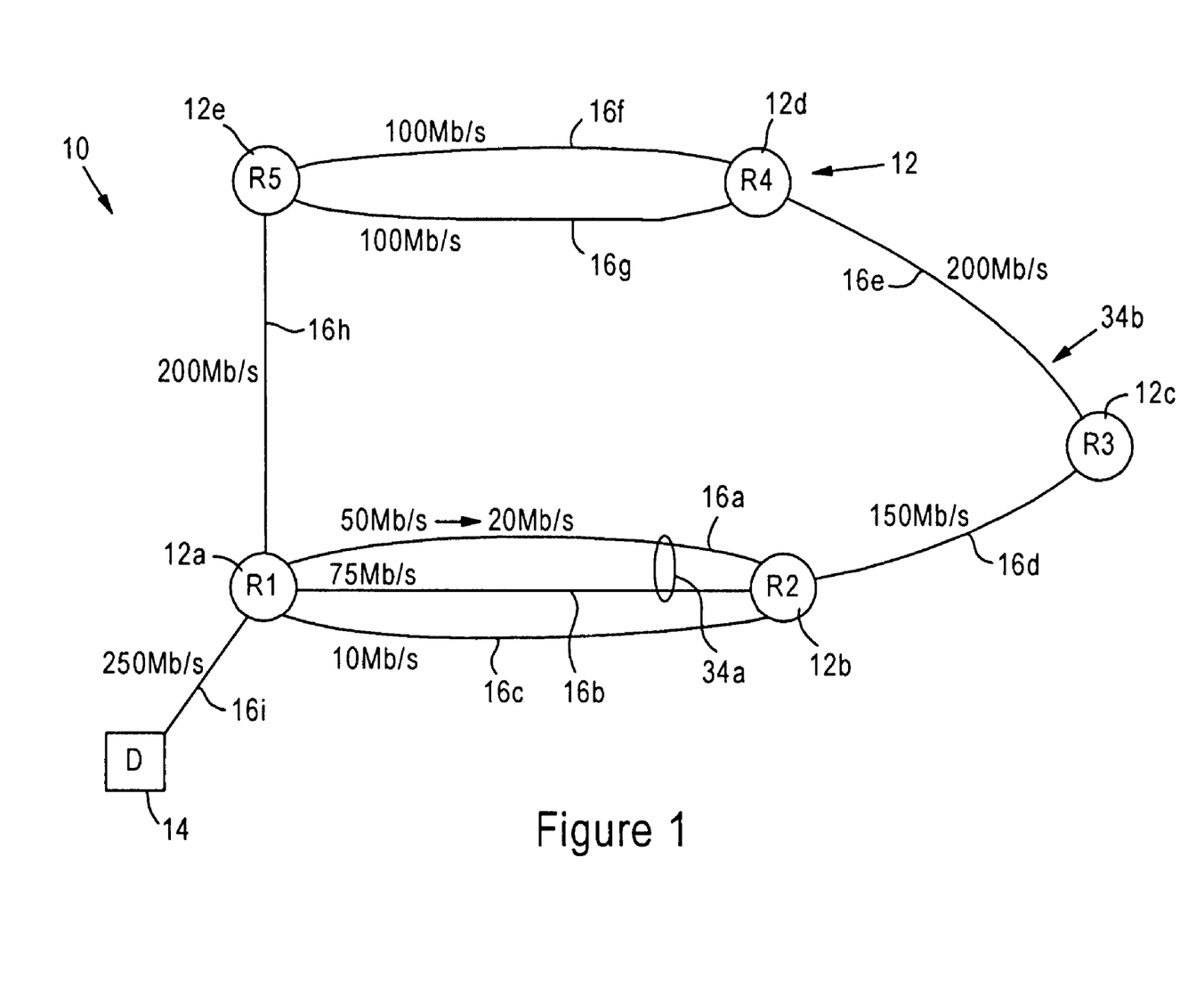
FIG. 1 is a diagram illustrating a network having routers configured for exchanging routing information, including update messages that specify changes in dynamic attributes of active paths, according to an embodiment of the present invention.

FIG. 1 discloses a network 10 having routers 12 configured for exchanging path attribute information according to a prescribed routing protocol, such as EIGRP, according to an embodiment of the present invention. Each of the routers 12 are interconnected by physical links 16, for example Ethernet (IEEE 802.3) or ATM links, that enable the routers 12 to forward traffic to a destination (D) 14.

As illustrated in FIG. 1, the routers may be interconnected by at least one link, however multiple links may be available between routers. In particular, the router 12a is connected to the router 12b via the 50 Megabit per second (Mb/s) link 16a, 75 Mb/s link 16b, and the 10 Mb/s link 16c. The routers 12b and 12c are interconnected only by the 150 Mb/s link 16d. The router 12c is connected to the router 12d by a 200 Mb/s link 16e, and the router 12d is connected to the router 12e by a 100 Mb/s link 16f and a 100 Mb/s link 16g. The router 12e is connected to the router 12a via a 200 Mb/s link 16h. Finally, the destination (D) 14 is connected to the router 12a via a 200 Mb/s link 16i.

Each router 12 is configured for real time monitoring of prescribed attributes of the links 16 that are connected to the router 12. Conventional EIGRP processing involve the router 12 outputting an update message only if a given link 16 encounters a link failure or a link recovery. Hence, an update message normally would be output only when a change in network topology is contemplated.

According to the disclosed embodiment, each router 12 is configured for monitoring in real time the prescribed attributes for each connected link 16, including but not limited to Delay, Bandwidth, MTU, hop count, reliability, and load. In response to detecting a change in any one of the prescribed attributes, the router 12 is configured for outputting an update message, according to the EIGRP protocol, that specifies the change detected by the router 12 in the prescribed attributes.

Moreover, each router (e.g., 12b) is configured for identifying a connected active path (e.g., 34a) based on associating at least one of the active links (e.g., 16a) connected to the same router (e.g., 12b). As illustrated in FIG. 1, the router 12b having the active links 16a and 16b connected to itself is configured for identifying that a prescribed destination (e.g., 14 or 12a) is concurrently reachable via either of the two active links 16a and 16b; consequently, the router 12b associates the two active links 16a and 16b as belonging to the same active path 34a. Moreover, the router 12b aggregates the dynamic attributes of the individual links 16a and 16b in order to form the combined dynamic attributes of the active path 34a.

Hence, the router 12b, in response to aggregating the attributes of the links 16a and 16b to form the combined dynamic attributes of the active path 34a, updates its internal topology tables and routing tables as described below, and outputs an EIGRP update message to the router 12c that specifies the change in the attributes for the active path 34a connected to the router 12b. In particular, since the aggregate bandwidth of the connected active path 34a is 125 Mb/s (50 Mb/s of link 16a plus 75 Mb/s of link 16b), the router 12b will send an EIGRP update message to the router 12c specifying that the destination 14 (or at least an IP address prefix that includes the destination 14) is reachable with a bandwidth of 125 Mb/s.

In contrast, the router 12d having non-aggregated links 16f and 16g, will report that the maximum bandwidth available for reaching the destination 14 is only 100 Mb/s.

Consequently, the router 12c can update its routing and topology tables to determine whether to route a packet to the destination 14 via router 12b or 12d. Hence, the router 12c will route traffic to the destination 14 via the router 12b instead of the router 12d based on the higher available bandwidth provided by the active path 34a.

Also note that the disclosed aggregation of links 16a and 16b is based on network-layer identification of destinations being concurrently reachable via the links 16a and 16b, as opposed to link layer trunking which requires manual reconfiguration of links. Hence, multi-link active paths can be dynamically created by the router 12b based on availability of the link 16, policy considerations, etc.

In addition, the monitoring of dynamic attributes enables the router 12b to output an EIGRP update message for the active path 34a if the router 12b detects the bandwidth of the connected link 16a is reduced from 50 Mb/s to 20 Mb/s, for example in the case of a satellite link that suffers a reduced bandwidth (or increased error rate) due to adverse link conditions (e.g., precipitation, etc.). In this case, the router 12b recalculates the bandwidth of the active path 34a as 95 Mb/s and outputs an EIGRP update message specifying that the destination 14 is reachable with an available bandwidth of 95 Mb/s, enabling the router 12c to perform routing optimization to determine whether the router 12d should be selected as a feasible successor according to the DUAL algorithm, described below.

Hence, the disclosed monitoring of prescribed attributes of the active path 34a connected to the router 12b enables the router to notify the neighboring router 12c of dynamic changes in the prescribed attributes (e.g, EIGRP metrics), enabling the routers 12b and 12c to more precisely control data flows and queuing policies based on dynamic changes in attributes in active paths.

Figure 2:
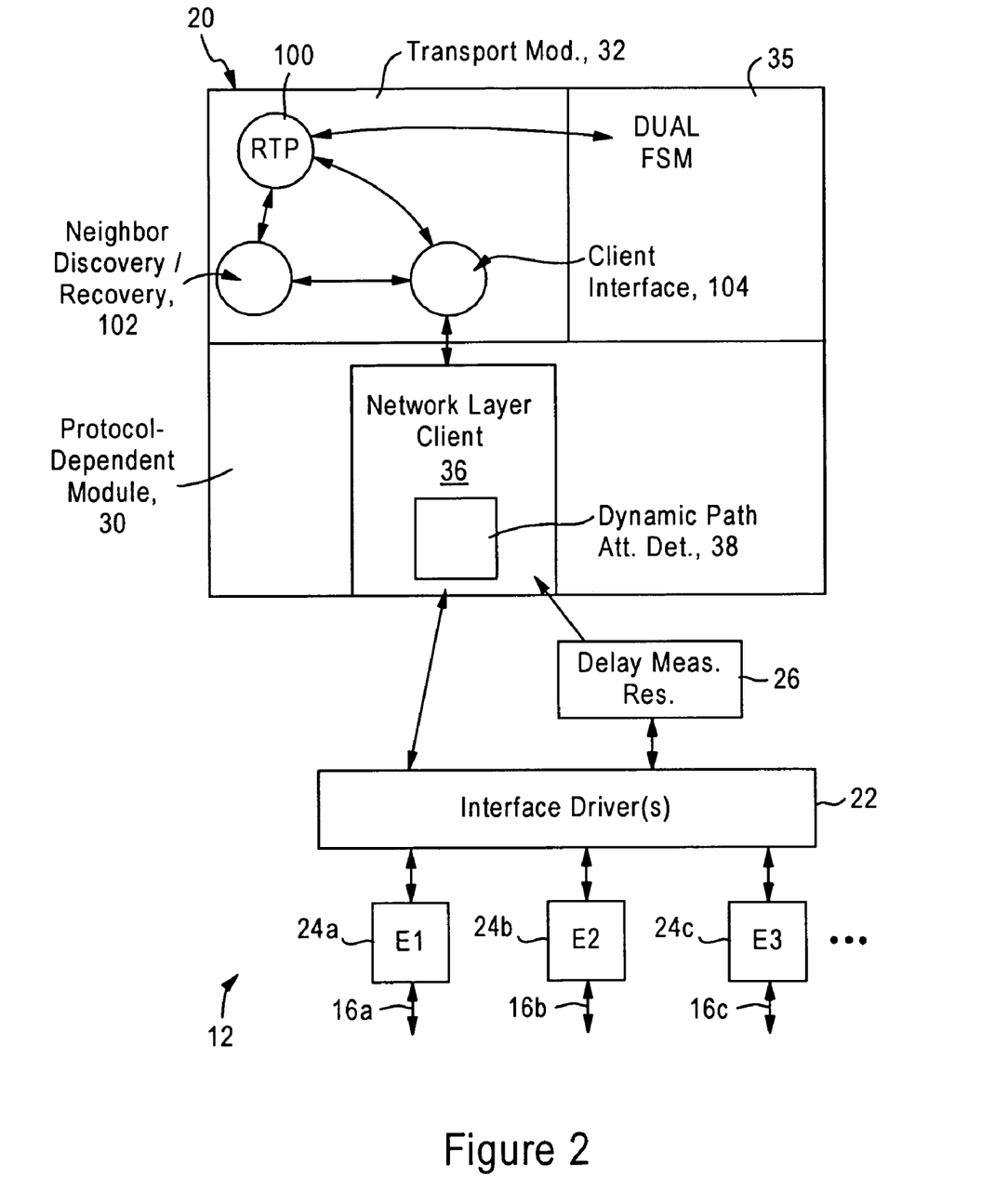
FIG. 2 is a diagram illustrating one of the routers of FIG. 1.

FIG. 2 is a diagram illustrating in detail the router 12 according to an embodiment of the present invention. The router 12 includes a protocol resource 20, at least one interface driver 22, a plurality of interfaces 24, and a delay measurement resource 26. The protocol resource 20 includes a protocol dependent module 30, a transport module 32, and a DUAL finite state machine 35.

The transport module 32 includes a reliable transport protocol (RTP) module 100, a neighbor discovery/recovery module 102, and a client interface 104, described below.

The protocol dependent module 30 includes a network layer client 36 that includes a dynamic path attribute detector 38.

The dynamic path attribute detector 38, also referred to as a monitoring resource 38, is configured for monitoring in real time, or at an arbitrary interval, the prescribed attributes of an active link 16 associated with a given active path 34. In particular, the dynamic path attribute detector 38 is configured for interfacing with the executable driver 22 of the hardware interfaces 24, for example an Ethernet (IEEE 802.3) interface. The interface driver 22 is configured for hardware-specific control of the corresponding interface 24, including monitoring link attributes such as quality. The interface driver 22 reports the link attributes to the dynamic path attribute detector 38; for example, the dynamic path attribute detector 38 may periodically poll the interface driver 22 for the monitored attributes, or the interface driver 22 may be configured to send an alert to the dynamic path attribute detector 38 in response to a prescribed event (e.g., the driver 22 determines that a given link attribute exceeds a corresponding threshold according to a prescribed hysteresis function). The hysteresis function is utilized to ensure that the interface driver 22 does not send unnecessary alerts in the event that a monitored attribute is near the corresponding threshold.

Each driver 22 (e.g., Ethernet driver, ATM driver for ATM interfaces (not shown)) is configured for measuring attributes such as load and reliability for its assigned interfaces 24. In addition, each interface driver 22 is configured for identifying bandwidth of a given link 16 as a physical attribute of the corresponding interface 24 (e.g., 10-Base T, 100-Base T, Gigabit Ethernet, etc.).

Figure 3:
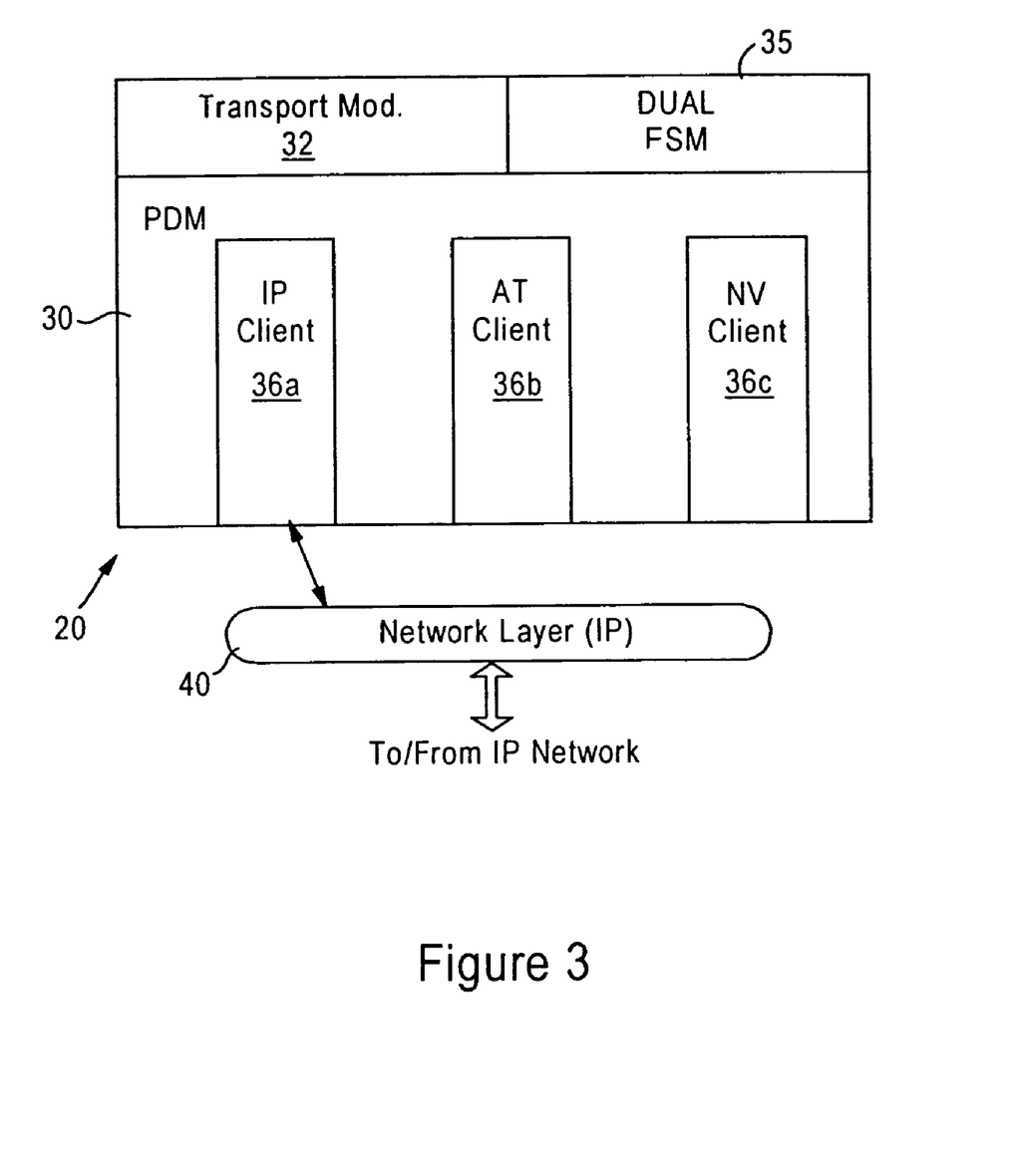
FIG. 3 is another diagram illustrating the router of FIG. 2 with emphasis on the EIGRP module.

FIG. 3 illustrates that the protocol dependent module (PDM) 30 may utilize different network layer clients 36 depending on the actual network topology being deployed at the network layer 40. In particular, the PDM 30 is configured for monitoring interfaces for changes, including link transitions and detected changes in attributes of a connected active path. The protocol dependent module 30 is configured for performing network layer operations, including building headers according to the corresponding network layer protocol. For example, the protocol dependent module 30 includes an Internet Protocol (IP) client 36a, an AppleTalk (AT) client 36b, and a Novell (NV) client 36c.

Figure 4:
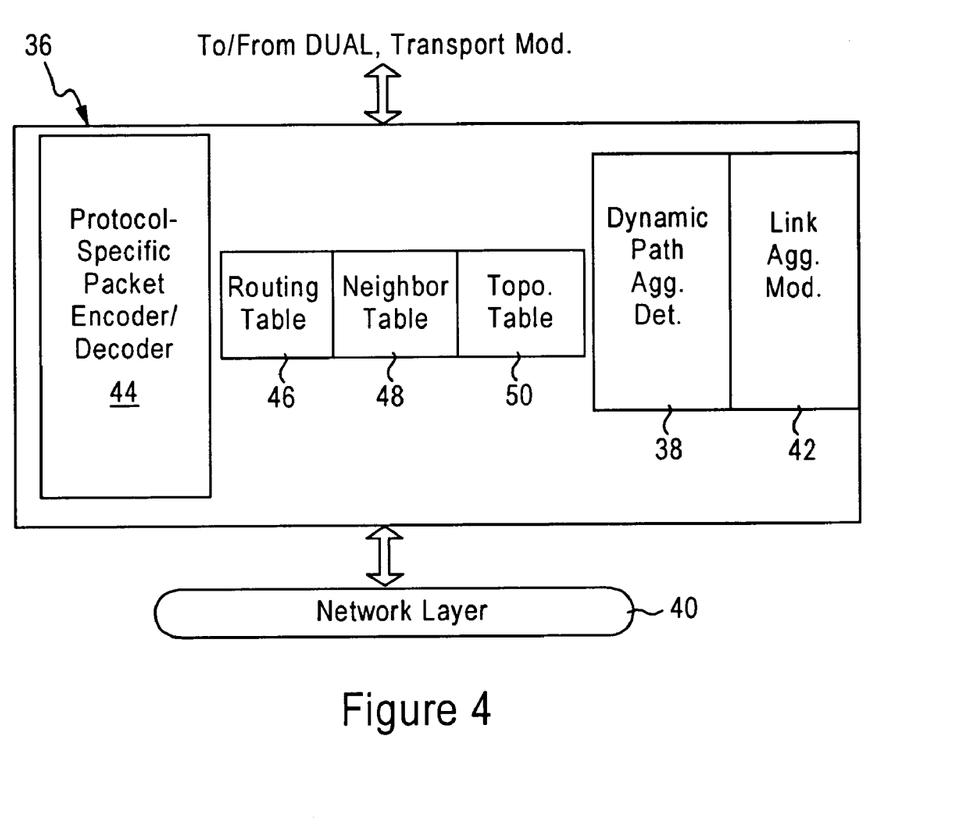
FIG. 4 is a diagram illustrating in detail an exemplary one of the protocol-dependent client modules of FIG. 3.

FIG. 4 is a diagram illustrating in further detail one of the network layer clients 36, according to an embodiment of the present invention. Each network layer client 36 includes the protocol-specific dynamic path attribute detector 38. Hence, the dynamic path attribute detector 38 is implemented in each network layer client 36 on a network protocol-specific basis. Each network layer client 36 also includes a link aggregation module 42, and a protocol-specific packet encoder/decoder 44.

Each client 36 includes tables configured for storing routing attributes (e.g., network layer addresses and link layer addresses) according to the corresponding network layer protocol. In particular, each client 36 includes a routing table 46, a neighbor table 48, and a topology table 50. The routing table 46 is configured for storing routing information, including address prefix and next-hop (i.e., destination path) information. The neighbor table 48 is configured for storing attributes associated with neighboring routers (i.e., routers serving as a peer endpoint for each connected link 16).

Figure 7:
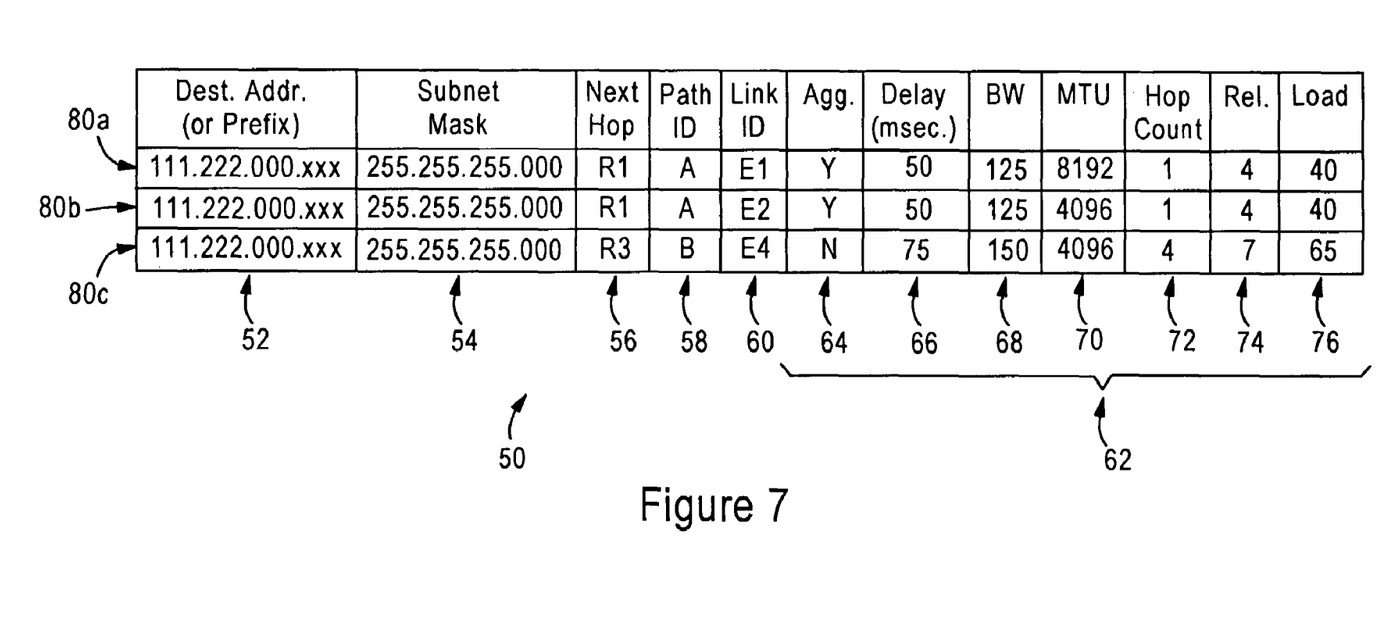
FIG. 7 is a diagram illustrating in detail the topology table of FIG. 4.

FIG. 7 is a diagram illustrating a topology table 50 for the IP-based client 36a. The topology table 50 is configured for storing attributes related to the topology of the network 10. In particular, the topology table 50 includes destination addresses 52 (or at least a prefix thereof), subnet masks 54, next hop router addresses 56, path identifiers 58 that specify the available paths 34 to routers, and link identifiers 60 that specify links 16 associated with a given path 34. The topology table 50 also is configured for storing the prescribed attributes 62 for each of the active paths, enabling the DUAL finite state machine 35 to identify optimal routes based on cost analysis using the prescribed attribute values stored in the topology table 50.

The prescribed attributes 62 stored in the topology table 50 include an aggregation (Agg.) 30 field 64, a delay field 66 (in milliseconds), a bandwidth field (in Mb/s) 68, an MTU field 70, a hop count field 72, a reliability field 74, and a load field 76.

As illustrated in FIG. 7, the topology information is stored in the topology table 50 based on a destination 52: each destination will list all the paths 34 to that destination, where each path is identified by an interface identifier 60 and a next hop router 56 (e.g., by its IP address). Hence, the router 12b will specify in its topology table 50 a destination 14 (D) having two sub-entries, namely a first entry 80a specifying the destination 14 is reachable via next-hop router 12a (R1) using interface link 16a, and a second entry 80b specifying the destination 14 is reachable via next-hop router 12a (R1) using interface link 16b. The routing table 46 for the router 12b also will include the two entries specifying the destination 14 (D) is reachable via next-hop router 12a (R1) using interface links 12a and 12b, respectively.

Also note that the topology table 50 includes an entry specifying that the destination 14 is reachable via the next hop router 12c and has a hop count of "4".

As described below, the dynamic path attribute detector 38 dynamically updates the tables 46, 48, and 50 based on detected changes in the links 16a, 16b, and 16c.

The delay attribute 66 is computed by the delay measurement resource 26 of FIG. 2 by sending a message on one of the links 16, and measuring the time to receive a reply to the message. Hence, the delay measurement resource 26 measures the delay for a given link 16 as the round trip time between transmitting a message and receiving a reply to the message divided by two.

The Maximum Transmission Unit (MTU) attribute 70 is a configurable option that is set by a user during configuration of the router 12. Since links 16 may be configured with different respective MTU values, the MTU value 70 for a given link 16 may need to be conveyed throughout the router 12 to ensure the appropriate packet length is sent via the links 16. The MTU attribute 70 is written into the topology table 50 by the transport module 32 to ensure that any changes in the MTU that are specified by received update packets are implemented in the routing table 46. Note, however, that in the case of aggregation of links for an active path 34, any update message for an active path 34 will specify the maximum MTU value specified among the associated active links (e.g., 16a and 16b) for the active path (e.g., 34a).

The Hop Count attribute 72 is retrieved by the dynamic path attribute detector 38 from the topology table 28. In particular, existing routing algorithms 20 use prescribed routing protocols (such as EIGRP) in order to determine the hop count to a destination 14 using a given path.

The Load attribute 76 also is obtained by the dynamic path attribute detector 38 from the interface driver 22, which monitors the data flows output by each associated interface 24; hence, the interface driver 22 can determine the amount of bandwidth being utilized by each associated interface 24. For example, if the interface driver 22 determines that data is being output by the interface 24a at a rate of 5 Mb/s and the available bandwidth for the interface 24a is 10 Mb/s, then the interface driver 22 identifies that the corresponding link 16a has a load of 50 percent; as traffic increases (e.g., another flow of data packets is output by the same link 16), the load increases toward 100 percent.

The Link Aggregation Module 42 of FIG. 4, also referred to as a link associating resource, is configured for associating connected links 16 with a given path 34. In particular, the link aggregation module 42 is configured for combining the resources of individual links 16 into a logical path 34, illustrated in FIG. 1. The link aggregation module 42 is configured for recognizing the links 16 connected to the router 12; the link aggregation module 42 monitors EIGRP-based update messages from a given destination (e.g., another router) via a given link (e.g,. 16a). Hence, if the link aggregation module 42 determines that the same destination (e.g., the router 12a) is reachable via more than one link (e.g, link 16a and link 16b), and the link aggregation module 42 determines that the links 16a and 16b providing reachability for that same destination are configured for load-sharing, the link aggregation module 42 associates the two links 16a and 16b with the same destination (e.g, the router 12a), and aggregates the appropriate metrics (such as bandwidth) and load.

Hence, the link aggregation module 42 is configured to identify which of the connected links 16 should be monitored for aggregation. If the link aggregation module 42 determines that the same destination is reachable via multiple links 16a and 16b at the same time, then if the link aggregation module 42 determines that load sharing is permitted between the links sharing the same destination, then the link aggregation module 42 aggregates the links sharing the same destination into the a single path 34 having aggregated attributes. The link aggregation module 42 supplies the aggregation information into the topology table 28 and the dynamic path attribute detector 38. Hence, the dynamic path attribute detector 38 is notified of the change in the dynamic attributes of the path 34 in that the links 16a and 16b are aggregated into the same path. The dynamic path attribute detector 38 in response aggregates the dynamic attributes (e.g., bandwidth), and report to the topology table 28 that the path 34 has an aggregate bandwidth that is a sum of the individual bandwidth values for the respective associated links 16a and 16b (e.g., totaling 125 Mb/s). Note that link 16c in this example is configured to not be aggregated.

Hence, since the existing active links 16a, 16b, are associated with a single path 34, the EIGRP protocol resource 20 will output an update message based on the aggregate bandwidth of the path 34 increasing due to the aggregation of the links 16a, and 16b.

Figure 6A:
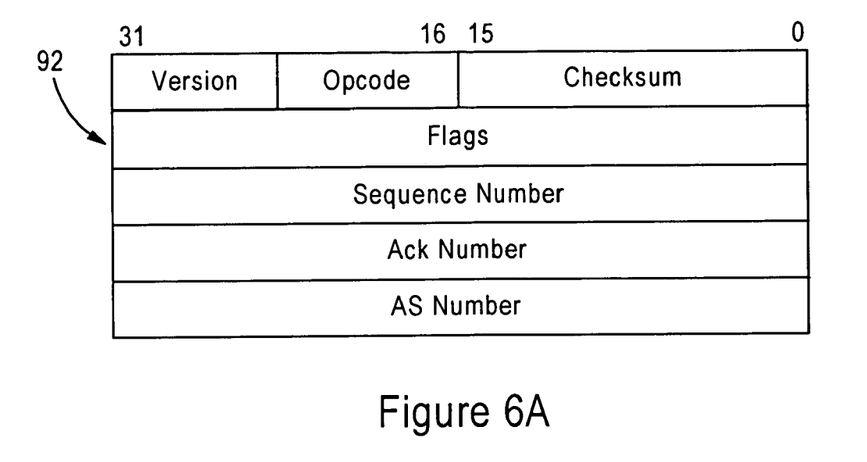
FIGS. 6A and 6B are diagrams illustrating the EIGRP header and the Type-Length-Value (TLV) frame of FIG. 5, respectively, generated by the transport module of FIG. 3.
Figure 6B:
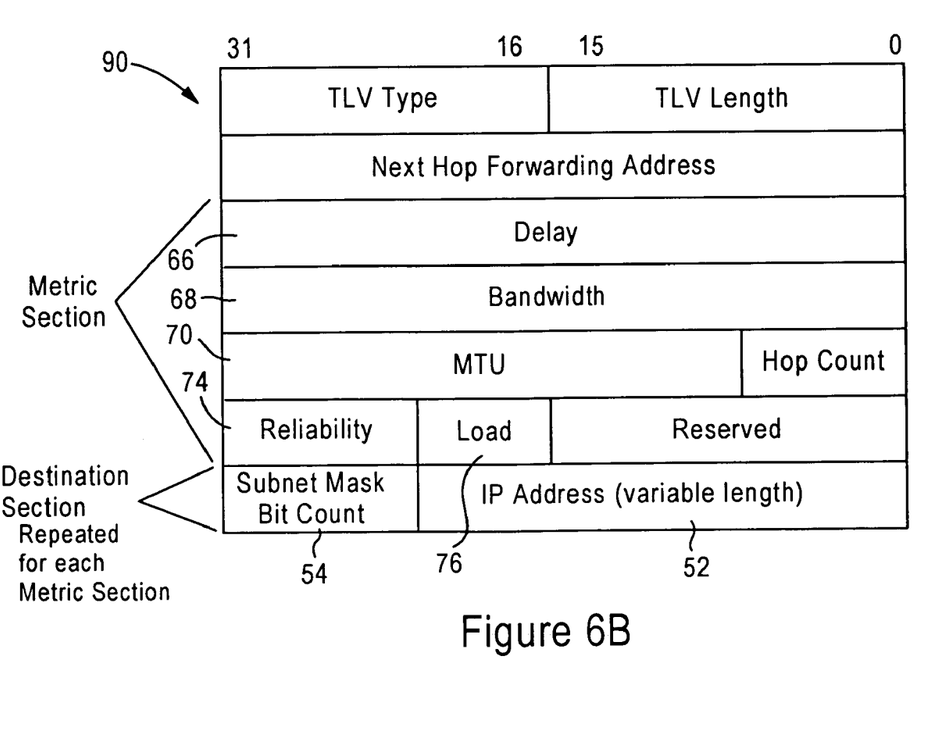

The Transport module 32 is configured for generating an EIGRP header 92 and a Time-Length-Value (TLV) frame 90, illustrated FIGS. 6A and 6B respectively and described in detail in the above-incorporated U.S. Pat. No. 5,519,704. The transport module 32 outputs the TLV frame 90 and the header 92 to the protocol dependent module 30. The TLV frame utilizes an EIGRP encoding format, where each attribute present in a routing packet is tagged.

Figure 5:
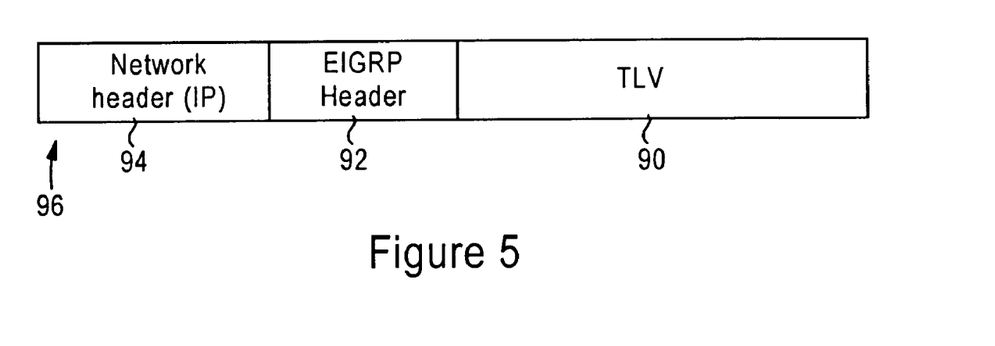
FIG. 5 is a diagram illustrating an Internet Protocol (IP) based EIGRP update message generated by the IP-based protocol-dependent client module of FIG. 3 for an IP network.

The protocol dependent module 30 is configured for constructing the update message 96 of FIG. 5 according to the corresponding network protocol utilized by the routers 12, in response to reception of the TLV frame, using the corresponding client 36. In particular, the protocol dependent module 30 will use the encapsulation services of the corresponding network layer being utilized; hence if the routers 12 in the network 10 are configured to utilize IP protocol, the TLV frame 90 and header 92 are sent to the network layer client 36a for generating an IP-based update message 96 based on encapsulating the header 92 and TLV frame 90 with an IP-based header; if the routers 12 in the network 10 are configured to utilize Apple-Talk protocol, the TLV frame 90 and header 92 are sent to the network layer client 36b for generating an AppleTalk network.-based update message; and if the routers 12 in the network 10 are configured to utilize Novell protocol, the TLV frame 90 and header 92 are sent to the network layer client 36c for generating a Novell network-based update message.

As apparent from the foregoing, the routers 12 typically are preconfigured for using only one of the network protocols, although a router could be configured to use multiple network protocols in the case of interfacing between networks having different network protocols, assuming each network layer client 36 had its own associated set of links 16 and paths 34 as reflected in the respective tables 46, 48, and 50.

Once the appropriate client 36 has generated the protocol-specific update message, the protocol dependent module 30 forwards the update message to the packet encoder/decoder 44.

The Transport Module 32 is configured for parsing received TLV messages recovered from the protocol dependent module 30. In particular, the protocol dependent module 30 is configured for receiving a protocol-specific update message from a peer router, removing the protocol-specific network layer header, and providing the remaining TLV portion of the message to the transport module 32.

The transport module 32 parses the received TLV messages, and updates the appropriate tables 46, 48, and 50 accordingly.

The DUAL finite state machine 35 is configured as a database handler resource, and is configured for performing cost function analysis as described in the above-incorporated U.S. Pat. No. 5,519,704. In particular, the DUAL finite state machine 35 interacts with the topology tables 50 in a generic (i.e., protocol-independent) manner. In other words, each topology table 50 includes protocol-independent parameters (such as the metric values), and protocol-dependent values (e.g, network address, link address, etc.) Hence, the DUAL finite state machine 35 performs cost analysis in the same manner for each of the network protocols using the protocol-independent parameters stored in the topology tables 50.

Hence, a protocol-specific update message received from the network 10 by the network layer 40 is passed to the corresponding network-specific client (e.g, 36a in the case of IP). The packet encoder/decoder 44 recovers the TLV from the protocol-specific EIGRP update message recovered by the corresponding client 36a. The packet encoder/decoder 44 then outputs the TLV to the RTP module 100, which is configured for performing the EIGRP operations. In particular, the RTP module 100 is configured identifying a received TLV message as specifying one of an EIGRP Query, an EIGRP Reply, an EIGRP Update, or an EIGRP Hello message. The RTP module 100 passes Queries, Replies, and Updates to the DUAL finite state machine 35, and Hellos to the neighbor discovery/recovery module 102.

The DUAL finite state machine 35, in response to receiving a Query, Reply, or Update, updates the corresponding topology table 50 related to paths (e.g., 34'). The DUAL finite state machine 35 also may access the neighbor discovery/recovery module 102 regarding updating the neighbor attributes stored in the neighbor table 48 related to neighboring routers (i.e., routers that terminate a connected link 16 or 16' with the router). Hence, routers 12c and 12a are neighboring routers of 12b.

Figure 8:
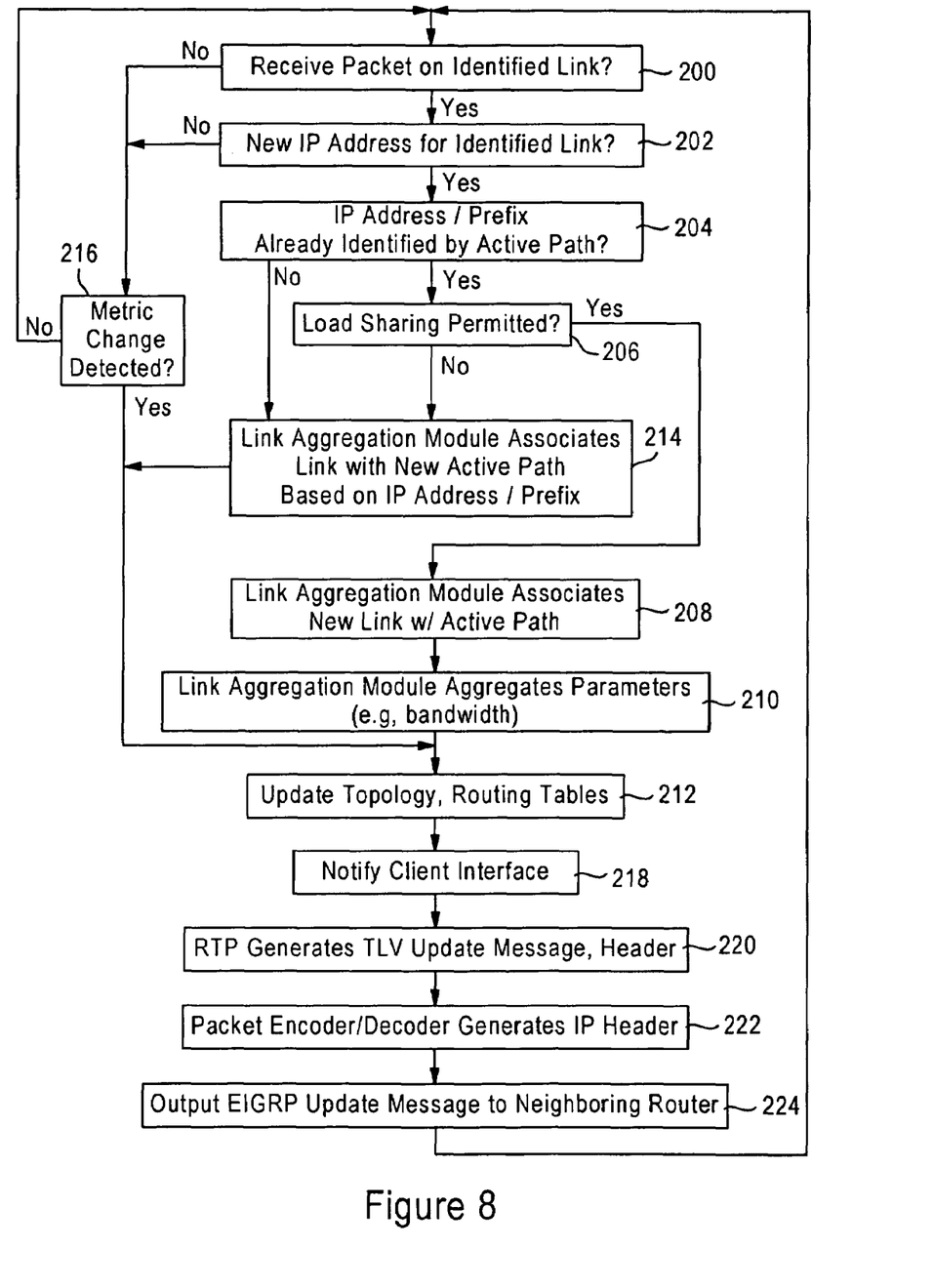
FIG. 8 is a diagram illustrating the method in a router of outputting a update message in response to detecting a change in a prescribed attribute of a connected active path, according to an embodiment of the present invention.

FIG. 8 is a diagram illustrating the method of sending an EIGRP update message in response to detecting a dynamic attribute change in an active path, according to an embodiment of the present invention. The steps described herein with respect to FIG. 8 can be implemented as executable code stored on a computer readable medium (e.g., floppy disk, hard disk, EEPROM, CD-ROM.

The method begins in step 200, where the link associating resource 42 determines whether an EIGRP packet is received on one of the connected identified links 16. If a packet is received, the link associating resource 42 determines whether the packet specifies a new IP address reachable via the identified link in step 202. If the packet specifies a new IP address on the identified link, the link associating resource 42 checks the topology table 50 in step 204 to determine whether the IP address is already identified by an active path specified in the topology table 50.

Assuming the link associating resource 42 detects a topology table entry 80 indicating the IP address is already identified by an active path, and if in step 206 load sharing is permitted between the identified link and the link specified in the table entry 80, the link aggregation module 42 associates the new link 16 with the active path in step 208, and updates the topology table 50 with a new entry 80. The link aggregation module 42 then aggregates the relevant dynamic parameters 62 in step 210, and updates the topology table 50 and routing table 46 accordingly in step 212.

Assuming that aggregation is not to be performed, the link associating resource 42 in step 214 associates the link with a new active path based on the IP address prefix. The topology and routing tables are updated accordingly in step 212.

The monitoring resource 38 concurrently determines in step 216 if a metric change is detected, for example by monitoring the interface driver 22 and the delay measurement resource 26. The monitoring resource 38, in response to detecting a metric change, updates the topology and routing tables in step 212.

The resource having updated the topology table 50 (e.g., the monitoring resource 38 or the link associating resource 42) notifies the client interface 104 in the transport module 32 in step 218. In response, the client interface 104 notifies the appropriate resource 100, 102, or the DUAL finite state machine (FSM) 35 to perform EIGRP operations in step 220. For example, the RTP resource 100 generates in step 220 a TLV update message 90 and header 92, and passes the TLV frame 90 and the header 92 to the protocol dependent module 30. The packet encoder/decoder 44 generates in step 222 the IP based EIGRP update message 96, and outputs in step 224 the update message 96 for transmission to the neighboring router.

Although the disclosed embodiment has been described with respect to using a distance vector routing protocol such as EIGRP, they will be appreciated that other routing protocols may be used. For example, the link state routing protocol Open Shortest Path First (OSPF), as described in the Internet Engineering Task Force (IETF) Request for Comments (RFC) 1247, may be used as an alternative by accessing the associated link state database which contains all link state information, including costs, to extrapolate bandwidth. A copy of the RFC 1247 is available at the IETF website at the address "http://www.ietf.org/rfc/rfc1247.txt?number=1247".

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a router, the method comprising:

identifying by the router an active path connected to the router and including at least first and second active links each terminated by the router and connecting the router to a first neighboring router that terminates the first and second active links, the first and second active links each configured for sending or receiving Internet Protocol (IP) data packets;

monitoring by the router prescribed attributes of the active path, the active path providing reachability by the router to a destination via the first neighboring router, the prescribed attributes of the active path based on an aggregation of at least selected ones of the prescribed attributes of the first active link and the second active link;

detecting by the router a change in at least one of the prescribed attributes of the connected active path, the change distinct from and not changing an availability of the active path; and outputting by the router an update message, specifying the change in the active path, to a second neighboring router in response to the detected change and according to a prescribed routing protocol.

2. The method of claim 1, wherein the identifying step includes:

associating the first active link connected to the router to the active path based on determining that the destination is reachable by the first active link; and storing in a topology table an entry that specifies the destination and a corresponding at least one interface identifier for the first active link.

3. The method of claim 2, wherein the identifying step further includes:

associating the second active link connected to the router to the active path based on determining that the destination is concurrently reachable by the first active link and the second active link;

determining that the first active link and the second active link are configured for enabling aggregation;

aggregating the selected ones of the prescribed attributes of the first active link and the second active link for the respective selected ones of the prescribed attributes of the active path; and storing in the entry in the topology table the prescribed attributes of the active path, and adding a second entry that specifies the destination, the interface identifier for the second active link, and the prescribed attributes of the active path.

4. The method of claim 3, wherein the detecting step includes detecting aggregation of the selected ones of the prescribed attributes of the first active link and the second active link for the respective selected ones of the prescribed attributes of the active path.

5. The method of claim 4, wherein the detecting step includes detecting a change in any one of delay, bandwidth, allowable transmission unit size, hop count, reliability, or load as the prescribed attributes.

6. The method of claim 1, wherein the detecting step includes detecting a change in any one of delay, bandwidth, allowable transmission unit size, hop count, reliability, or load as the prescribed attributes.

7. The method of claim 6, wherein the detecting step further includes obtaining information associated with at least one of the prescribed attributes of the first active link from an executable driver resource configured for controlling an interface configured for establishing the first active link.

8. The method of claim 7, wherein the information includes any one of the bandwidth, the reliability, the load or the allowable transmission unit size.

9. The method of claim 6, wherein the detecting step further includes determining the delay based on measuring a time between transmitting a data packet onto the first link and receiving a response to the data packet via the first link.

10. The method of claim 1, wherein the prescribed routing protocol is Enhanced Interior Gateway Routing Protocol (EIGRP) protocol.

11. The method of claim 1, wherein the detecting of the change in at least one of the prescribed attributes of the active path is based on detecting a change in a link attribute in any one of the first active link or the second active link, the change in the link attribute distinct from availability of the corresponding active link.

12. A router comprising:
a plurality of interfaces configured for establishing respective active links, including first and second active links each terminated by a corresponding one of the interfaces and connecting the router with a first neighboring router the terminates the first and second active links, and the active links including a third active link terminated by a corresponding one of the interfaces and connecting the router with a second neighboring router that terminates the third active link, the first and second active links each configured for sending or receiving Internet Protocol (IP) data packets:

a link associating resource configured for associating an active path connected to the router with at least the first and second active links that are connected to the router, the active path providing reachability by the router to an identifiable destination via the first neighboring router;

a monitoring resource configured for monitoring prescribed attributes of the active path connected to the router, the prescribed attributes of the active path based on an aggregation of at least selected ones of the prescribed attributes of the first active link and the second active link, the monitoring resource detecting a change in at least one of the prescribed attributes of the connected active path, the change distinct from and not changing an availability of the connected active path; and a routing protocol resource configured for outputting an update message, specifying the change in the connected active path, to the second neighboring router in response to the detected change and according to a prescribed routing protocol.

13. The router of claim 12, further comprising a topology table configured for storing entries, each entry identifying a destination and whether the corresponding destination is reachable;

wherein the link associating resource is configured for associating the first active link connected to the router to the active path based on determining that the identifiable destination is reachable by the first active link, the link associating resource configured for storing in the topology table an entry that specifies the identifiable destination and a corresponding interface identifier for the first active link.

14. The router of claim 13, wherein:
the link associating resource is configured for associating the second active link connected to the router to the active path based on determining that the identifiable destination is concurrently reachable by the first active link and the second active link, and determining that the first active link and the second active link are configured for enabling aggregation;

the link associating resource is configured for aggregating the selected ones of the prescribed attributes of the first active link and the second active link for the respective selected ones of the prescribed attributes of the active path;

the link associating resource is configured for storing in the entry in the topology table the prescribed attributes of the active path, and adding a second entry that specifies the identifiable destination, the interface identifier for the second active link, and the prescribed attributes of the active path.

15. The router of claim 14, wherein the monitoring resource is configured for detecting aggregation of the selected ones of the prescribed attributes of the first active link and the second active link for the respective selected ones of the prescribed attributes of the active path.

16. The router of claim 15, wherein the monitoring resource is configured for detecting a change in any one of delay, bandwidth, allowable transmission unit size, hop count, reliability, or load as the prescribed attributes.

17. The method of claim 12, wherein the monitoring resource is configured for detecting a change in any one of delay, bandwidth, allowable transmission unit size, hop count, reliability, or load as the prescribed attributes.

18. The router of claim 17, wherein the monitoring resource is configured for obtaining information associated with at least one of the prescribed attributes of the first active link from an executable driver resource configured for controlling at least one of the interfaces.

19. The router of claim 18, wherein the information includes any one of the bandwidth, the reliability, the load or the allowable transmission unit size.

20. The router of claim 17, further comprising a delay measurement resource configured for determining the delay based on measuring a time between transmitting a data packet onto the first link and receiving a response to the data packet via the first link, the delay measurement resource reporting the determined delay to the monitoring resource.

21. The router of claim 12, wherein the routing protocol resource is configured for outputting the update message according to Enhanced Interior Gateway Routing Protocol (EIGRP) protocol as the prescribed routing protocol.

22. The router of claim 12, wherein the detecting of the change in at least one of the prescribed attributes of the active path is based on detecting a change in a link attribute in any one of the first active link or the second active link, the change in the link attribute distinct from availability of the corresponding active link.

23. A computer readable storage medium having stored thereon sequences of instructions for outputting an update message by a router, the sequences of instructions including instructions for:

identifying by the router an active path connected to the router and including at least first and second active links each terminated by the router and connecting the router to a first neighboring router that terminates the first and second active links, the first and second active links each configured for sending or receiving Internet Protocol (IP) data packets;

monitoring by the router prescribed attributes of the active path, the active path providing reachability by the router to a destination via the first neighboring router, the prescribed attributes of the active path based on an aggregation of at least selected ones of the prescribed attributes of the first active link and the second active link;

detecting by the router a change in at least one of the prescribed attributes of the connected active path, the change distinct from and not changing an availability of the active path; and outputting by the router an update message, specifying the change in the active path, to a second neighboring router in response to the detected change and according to a prescribed routing protocol.

24. The medium of claim 23, wherein the identifying step includes:

associating the first active link connected to the router to the active path based on determining that the destination is reachable by the first active link; and storing in a topology table an entry that specifies the destination and a corresponding at least one interface identifier for the first active link.

25. The medium of claim 24, wherein the identifying step further includes:

associating the second active link connected to the router to the active path based on determining that the destination is concurrently reachable by the first active link and the second active link;

determining that the first active link and the second active link are configured for enabling aggregation;

aggregating the selected ones of the prescribed attributes of the first active link and the second active link for the respective selected ones of the prescribed attributes of the active path; and storing in the entry in the topology table the prescribed attributes of the active path, and adding a second entry that specifies the destination, the interface identifier for the second active link, and the prescribed attributes of the active path.

26. The medium of claim 23, wherein the detecting step includes detecting a change in any one of delay, bandwidth, allowable transmission unit size, hop count, reliability, or load as the prescribed attributes.

27. The medium of claim 26, wherein the detecting step further includes obtaining information associated with at least one of the prescribed attributes of the at least one active link from an executable driver resource configured for controlling an interface configured for establishing the first active link.

28. The medium of claim 23, wherein the prescribed routing protocol is Enhanced Interior Gateway Routing Protocol (EIGRP) protocol.

29. The medium of claim 23, wherein the detecting of the change in at least one of the prescribed attributes of the active path is based on detecting a change in a link attribute in any one of the first active link or the second active link, the change in the link attribute distinct from availability of the corresponding active link.

30. A router comprising:

means for identifying an active path connected to the router and including at least first and second active links each terminated by the router and connecting the router to a first neighboring router that terminates the first and second links, the first and second active links each configured for sending or receiving Internet Protocol (IP) data packets;

means for monitoring prescribed attributes of the active path, the active path providing reachability by the router to a destination via the first neighboring router, the prescribed attributes of the active path based on an aggregation of at least selected ones of the prescribed attributes of the first active link and the second active link;

means for detecting a change in at least one of the prescribed attributes of the connected active path, the change distinct from and not changing an availability of the active path; and means for outputting an update message, specifying the change in the active path, to a second neighboring router in response to the detected change and according to a prescribed routing protocol.

31. The router of claim 30, wherein the identifying means is configured for:

associating the first active link connected to the router to the active path based on determining that the destination is reachable by the first active link; and storing in a topology table an entry that specifies the destination and a corresponding at least one interface identifier for the first active link.

32. The router of claim 31, wherein the identifying means is configured for:

associating the second active link connected to the router to the active path based on determining that the destination is concurrently reachable by the first active link and the second active link;

determining that the first active link and the second active link are configured for enabling aggregation;

aggregating the selected ones of the prescribed attributes of the first active link and the second active link for the respective selected ones of the prescribed attributes of the active path; and storing in the entry in the topology table the prescribed attributes of the active path, and adding a second entry that specifies the destination, the interface identifier for the second active link, and the prescribed attributes of the active path.

33. The router of claim 32, wherein the detecting means is configured for detecting aggregation of the selected ones of the prescribed attributes of the first active link and the second active link for the respective selected ones of the prescribed attributes of the active path.

34. The router of claim 33, wherein the detecting means is configured for detecting a change in any one of delay, bandwidth, allowable transmission unit size, hop count, reliability, or load as the prescribed attributes.

35. The router of claim 30, wherein the detecting means is configured for detecting a change in any one of delay, bandwidth, allowable transmission unit size, hop count, reliability, or load as the prescribed attributes.

36. The router of claim 35, wherein the detecting means is configured for obtaining information associated with at least one of the prescribed attributes of the first active link from an executable driver resource configured for controlling an interface configured for establishing the first active link.

37. The router of claim 36, wherein the information includes any one of the bandwidth, the reliability, the load or the allowable transmission unit size.

38. The router of claim 35, wherein the detecting means is configured for determining the delay based on measuring a time between transmitting a data packet onto the first link and receiving a response to the data packet via the first link.

39. The router of claim 30, wherein the prescribed routing protocol is Enhanced Interior Gateway Routing Protocol (EIGRP) protocol.

40. The router of claim 30, wherein the detecting of the change in at least one of the prescribed attributes of the active path is based on detecting a change in a link attribute in any one of the first active link or the second active link, the change in the link attribute distinct from availability of the corresponding active link.

* * * * *